UNITED STATES PATENT OFFICE.

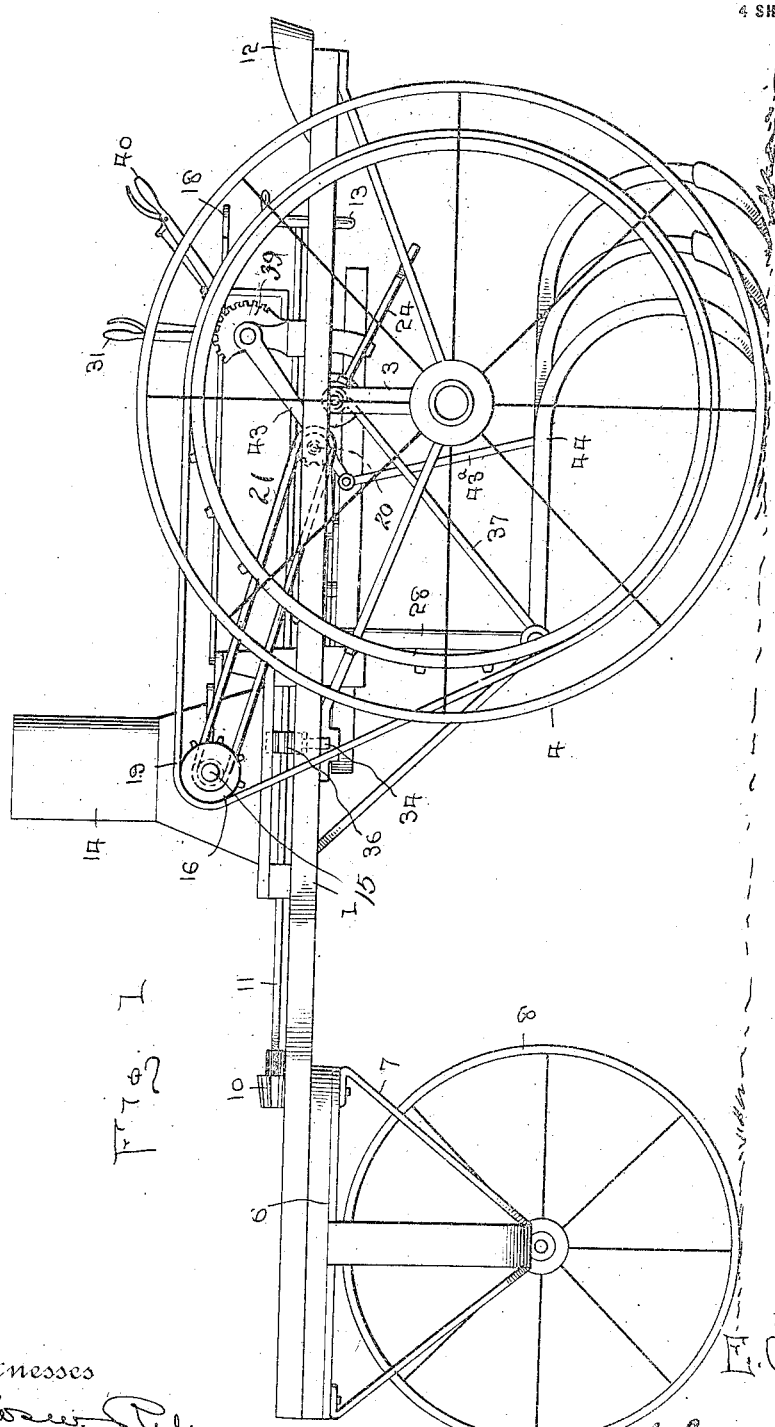

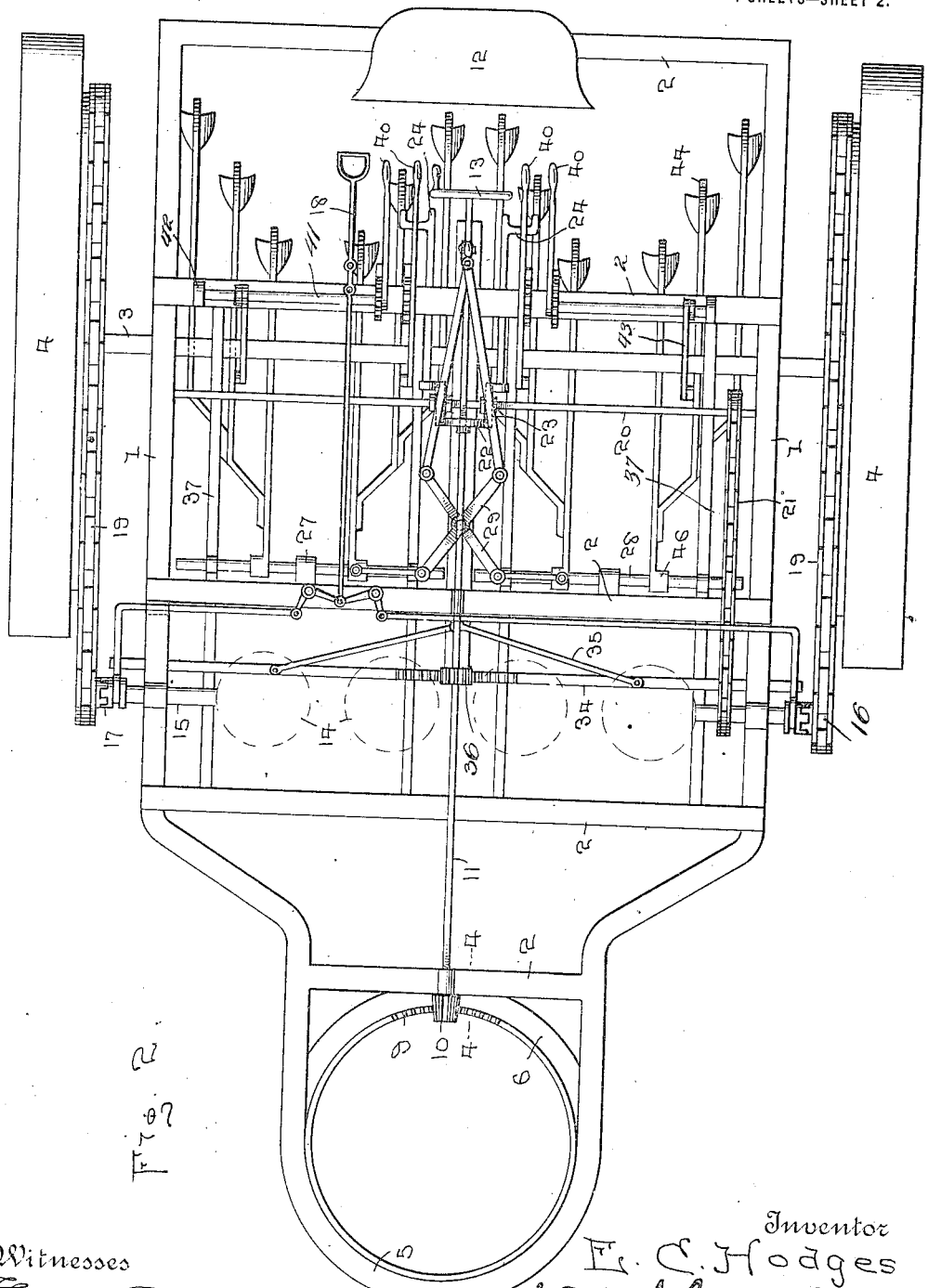

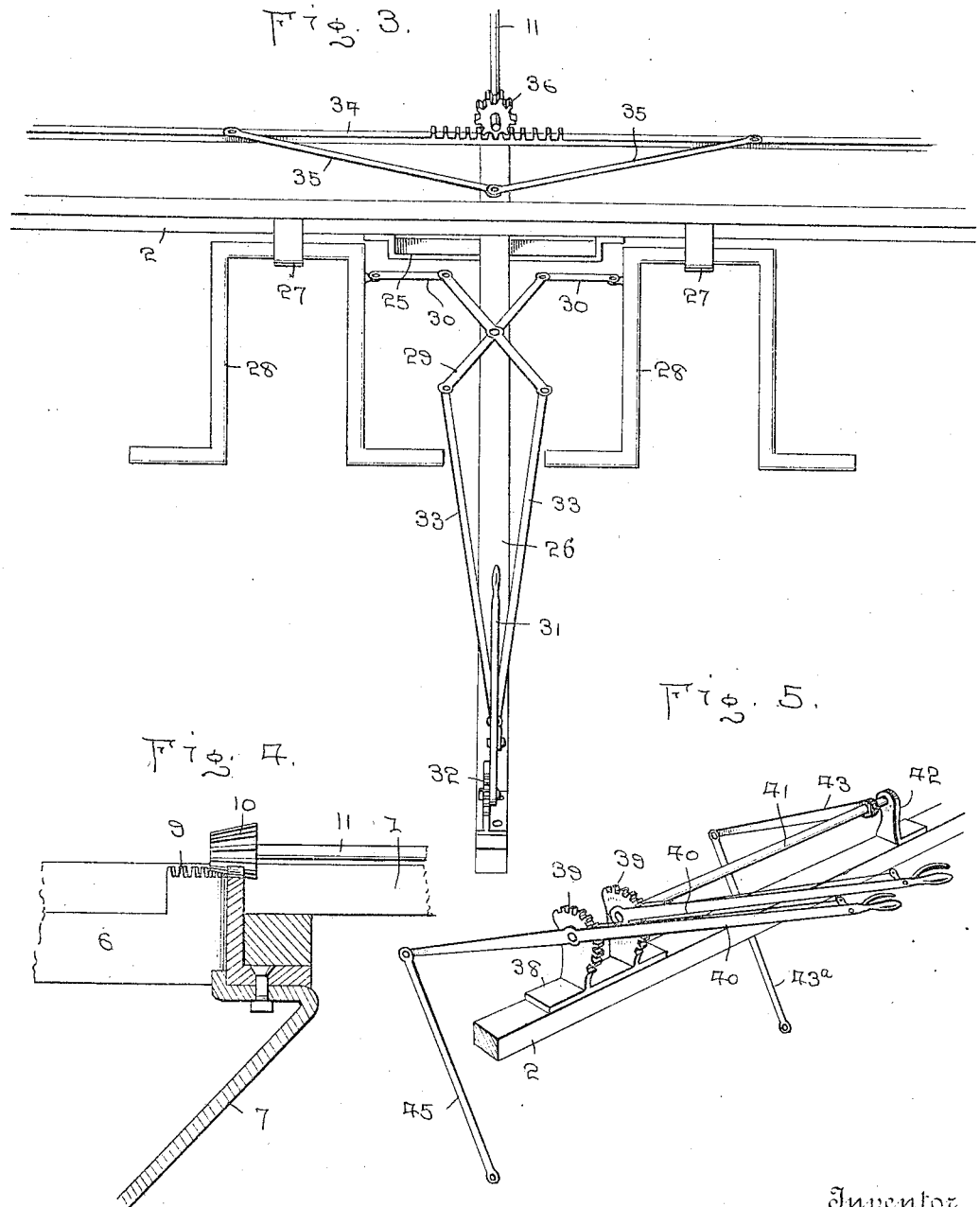

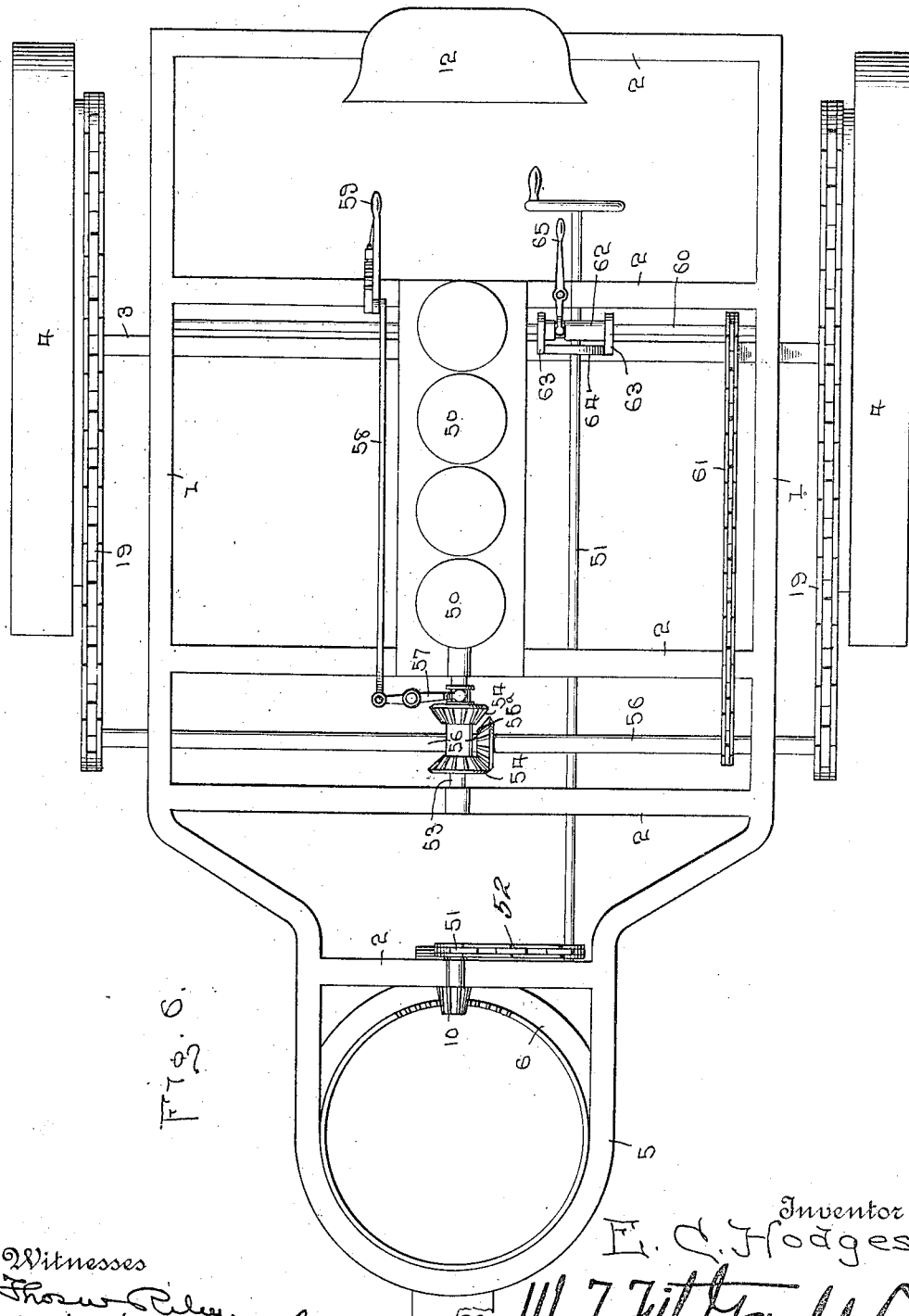

EUGENE C. HODGES, OF GREGORY, TEXAS.

CULTIVATOR.

1,137,621.      Specification of Letters Patent.      Patented Apr. 27, 1915.

Application filed July 12, 1913. Serial No. 778,634.

*To all whom it may concern:*

Be it known that I, EUGENE C. HODGES, citizen of the United States, residing at Gregory, in the county of San Patricio and State of Texas, have invented certain new and useful Improvements in Cultivators; and I do hereby declare the following to be a full, clear, and exact description of the invention, such as will enable others skilled in the art to which it appertains to make and use the same.

This invention relates to a motor driven cultivator adapted to be attached to various types of cultivating devices to draw the latter over the ground to be cultivated.

A further object is to provide the vehicle with a plurality of arch cultivator supporting members and means for adjusting said members together with the cultivator devices attached thereto.

A further object is to provide connections between the steering gear and the arches, whereby the latter together with the cultivating devices attached thereto, are automatically shifted when the steering gear is actuated to change the course of the vehicle.

A further object is to provide means adapted to be connected with the cultivating devices attached to the vehicle to adjust the pitch of said devices.

In the accompanying drawings, wherein is shown a preferred embodiment of the invention, Figure 1 represents a side elevation of the complete device. Fig. 2 represents a top plan view of the invention, showing the engines in dotted lines. Fig. 3 represents an enlarged detail view in perspective of a portion of only the adjusting means for the adjustable arch members. Fig. 4 represents a detail sectional view on the line 4—4 of Fig. 2. Fig. 5 represents an enlarged fragmentary view in perspective of the means for raising and lowering the cultivators attached to the vehicle, and Fig. 6 represents a top plan view of a slightly modified form of the invention.

Referring to the several views, 1 indicates the longitudinal side rails of the frame of the vehicle and 2; the cross rails connecting the rails 1. The rear axle 3 is supported under the rear portion of the frame and carries the rear or drive wheels 4. The forward part of the frame is curved at 5 to receive and coöperate with the fifth wheel 6, carrying the depending bracket 7, rotatably receiving the steering wheel 8. The portion 9 of the fifth wheel 6 is extended upwardly and adapted to coöperate with a pinion 10 fixed to the end of the steering shaft 11. The steering shaft 11 is extended rearwardly and terminates at a point adjacent to the seat 12, whereby the steering wheels 8 may be conveniently shifted by operating the handle wheel 13 fixed to the rear end of said shaft.

A plurality of engines 14 are rigidly secured above the frame of the vehicle and arranged transversely thereof. The crank shaft 15 of the engines is provided with sprocket wheels 16 at the ends thereof which are adapted to be coupled with the shaft 15 by suitable clutch devices 17, operable by the handle lever 18, located at a point adjacent the seat 12. Extending over a suitable sprocket wheel fixed to the drive wheels 14 and over the sprocket wheels 16 are drive chains 19.

In the frame of the vehicle, intermediate the engines 14 and the rear of the frame is rotatably mounted a shaft 20 carrying a sprocket wheel over which is adapted to run a sprocket chain 21, which latter also extends over a sprocket wheel on the shaft 15. A friction disk 22 is rigidly fixed to the steering shaft 11 and is adapted to coöperate with friction disks 23 slidably keyed upon the shaft 20. The disks 23 are adapted to be moved longitudinally of the shaft 20 by suitable foot pedals 24, whereby either of the disks 23 arranged on opposite sides of the disk 22, may be engaged against the side of the latter disk to rotate the shaft 11 together with the steering wheel 8 in the desired direction. The intermediate cross rail 2 is provided with a depending strap 25 extending longitudinally of said rail and spaced therefrom to receive a beam 26, which latter is pivoted at its rear end to the rear axle 3. The cross rail 2 also carries rearwardly extending arms 27 having suitable bores to receive the upper horizontal portions of arch members 28.

A pair of lazy tongs 29 is pivoted to the beam 26 adjacent the forward end of the latter, and the forward ends of said tongs are connected to the vertical portions of the arches 28 by the links 30. Adjacent the rear end of the beam 26 is pivoted a hand lever 31 adapted to coöperate with a suitable rack 32 and carrying a suitable spring actuated lug adapted for engagement with the teeth of said rack to lock the lever in adjusted position. The hand lever 31 is connected with the rear ends of the lazy tongs 29 by the links 33.

The portion of the beam 26 which extends forwardly of the cross rail 2 carries a rack bar 34, the ends of which are slidably mounted through the frame of the vehicle and which is reliably held against movement relative to the beam 26 by the braces 35. The teeth of the rack bar 34 are located adjacent the center thereof and are adapted to coöperate with a pinion 36 fixed to the steering shaft 11. The lower horizontal portions of the arch members 28 are slidably received within the braces 37 depending from the side rails 1 of the frame of the vehicle, and are reliably supported thereby.

Brackets 38 are fixed to one of the rear cross beams 2 and have upstanding segmental racks 39 to which are pivoted adjustable hand levers 40. The hand levers 40 are mounted in pairs upon opposite sides of the steering wheel 13, and the outer lever of each pair is fixed to the shaft 41 which extends longitudinally of the cross beam 2 and is mounted at the outer end in a bracket bearing 42. The crank arms 43 are fixed to the shafts 41, adjacent the outer ends thereof and are pivotally connected with links 43ª adapted to be suitably fixed to a gang 44 of plows, or any other farming implement which may be attached to the vehicle. The inner hand levers 40 are also provided with links 45 which are similarly connected with the inside gangs 44. The gang heads 46 are suitably connected with the lower horizontal portions of the arch members 28.

In operation, the machine is driven by the engines 14 by connecting the crank shaft 15 thereof with the sprocket wheels 16 by proper manipulation of the hand lever 18, as will be understood. For steering the vehicle, the front wheels 8 thereof may be turned either by the manual operation of the hand wheel 13 or by the actuation of the proper pedal 24, which as previously described, engages one of the friction disks 23 against the disk 22 and consequently rotates the latter disk together with the shaft 11 in the desired direction. As the vehicle is steered from a straight course, the rotation of the shaft 11 is imparted to the beam 26 by means of the pinion 36 and rack 34, causing the beam to be shifted upon its pivot and consequently shifting the lazy tongs 29 together with the links 30 and arch members 28 outwardly from the course taken by the vehicle. Movement of the arch members 28 obviously is imparted to the gangs 44. To manually separate the implements carried by the arch members 28, the hand lever 31 is moved forwardly, while a reverse movement of said lever draws the implement carried by the separate arch members together.

In the modification of my invention illustrated in Fig. 5, a frame of similar construction as that illustrated in Figs. 1 to 5 is employed, however, in said modification, the engines 50 are arranged longitudinally of the frame and centrally thereof. To accommodate this arrangement of the power plant, the steering shaft 51 is formed in two parts, each being provided with sprocket wheels over which extends a sprocket chain 52 for connecting the parts of said shaft and causing them to rotate in unison.

The crank shaft 53 of the engine is provided with a pair of spaced bevel gears 54 which are adapted to be meshed with a gear 55 carried by the transversely extending shaft 56. The gears 54 are preferably fixed on a sleeve 56ª which is keyed on the crank shaft 53 and adapted to be moved longitudinally thereon by a pivoted lever 57, link 58 and hand lever 59. It will be understood that by alternately engaging the front and rear bevel gears 54 with the gear 55, the shaft 56 will be rotated in the desired direction to drive the vehicle forwardly or rearwardly. When the gears 54 are moved to an intermediate position, they are both out of mesh with the gear 55 and the engines 50 may be consequently driven free. A second shaft 60 located rearwardly of the shaft 56 is adapted to be rotated by the latter through the medium of a sprocket chain 61 extending over suitable sprocket wheels fixed to said shafts. The rear shaft 60 carries a sleeve 62 to which is fixed a pair of friction disks 63 adapted for alternate engagement upon opposite sides of a friction disk 64 fixed to the steering shaft 51. The sleeve 62 is connected with a pivoted lever 65 by means of which the friction disks 63 are shifted in the proper direction to rotate the shaft 51 in the desired direction.

What I claim is:—

1. In a motor propelled vehicle, a frame, cross bars for said frame, drive wheels depending from said frame, a front steering wheel positioned forwardly of said drive wheels, a beam pivoted to one of said cross bars, a bracket secured to the other of said cross bars for slidably supporting said beam, arch members slidably mounted on the second of said cross bars, means for grouping or separating said arch members associated with said beam, a transversely slidable rack bar supported by said frame and connected to said beam, a steering shaft connecting with said front steering wheel, a hand wheel for said shaft, a pinion carried by said shaft and meshing with said rack bar so that manual operation of said hand wheel will swing said front steering wheel to change the course of said vehicle and to simultaneously shift said pivoted beam so that said arch members are given a turning curve of larger radius than the vehicle.

2. In a motor propelled vehicle, a frame, cross bars for said frame, drive wheels depending from said frame, a front steering wheel positioned forwardly of said drive wheels, a beam pivoted to one of said cross bars, a bracket secured to the other of said cross bars for slidably supporting said beam, arch members slidably mounted on the second of said cross bars, means for grouping or separating said arch members associated with said beam, a transversely slidable rack bar supported by said frame and connected to said beam, a steering shaft connecting with the said front steering wheel, a pinion carried by said shaft and meshing with said rack bar so that said front steering wheel can be partially rotated by the motor of the vehicle to change the course of the latter and to simultaneously shift said pivoted beam to give said arch members a turning curve of larger radius.

3. In a motor propelled vehicle, a frame, cross bars for said frame, drive wheels depending from said frame, a steering wheel positioned forwardly of said drive wheels, a beam pivoted to one of said cross bars, a bracket secured to the other of said cross bars for slidably supporting said beam, arch members slidably mounted on the second cross bars, means for grouping or separating said arch members, a shaft positioned transversely of said frame, a pair of shiftable friction disks mounted on said shaft, a third friction disk adapted to be singly mated with either of first said disks and to be connected to said steering wheel and means for driving said shaft by the motor of the vehicle to change the course of the latter and to impart simultaneously the movement to said pivoted beam whereby said arch members are given a turning curve of larger radius than the vehicle.

In testimony whereof I have signed my name to this specification in the presence of two subscribing witnesses.

EUGENE C. HODGES.

Witnesses:
E. J. MILLER,
A. D. TOLAND.